July 18, 1939. C. T. DOMAN 2,166,398
INTERNAL COMBUSTION ENGINE
Filed April 5, 1938 2 Sheets-Sheet 2
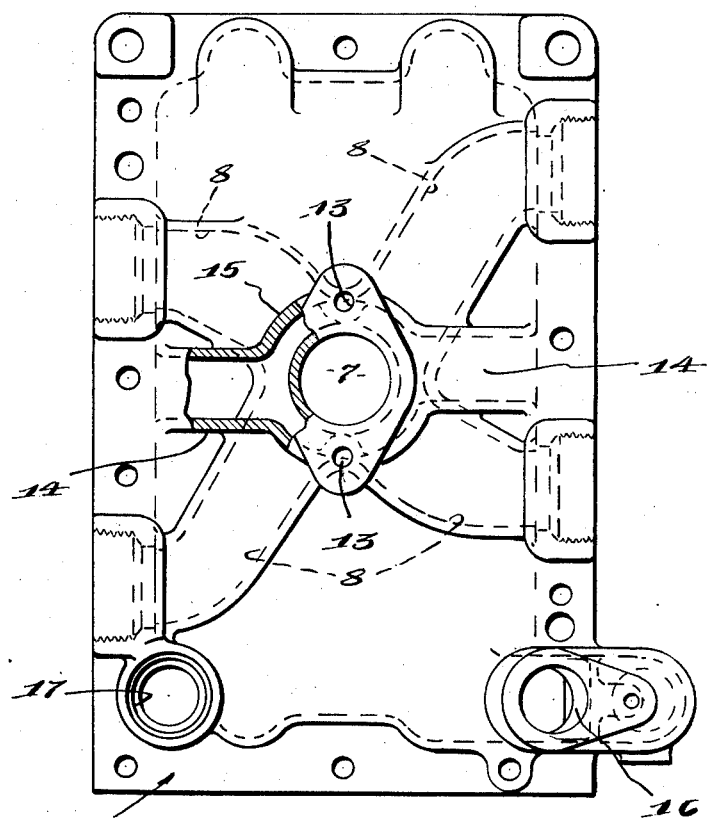
Fig-2-
Fig-3-
INVENTOR.
Carl T. Doman
BY Bodell & Thompson
ATTORNEYS.

Patented July 18, 1939

2,166,398

UNITED STATES PATENT OFFICE 2,166,398

INTERNAL COMBUSTION ENGINE

Carl T. Doman, Geddes, N. Y., assignor to Air Cooled Motors Corporation, Liverpool, N. Y., a corporation of New York Application April 5, 1938, Serial No. 200,158

2 Claims. (Cl. 123—122)

This invention relates to internal combustion engines, and has for its object the relative arrangement of the intake manifold and the oil sump, whereby the distributing chamber of the intake manifold as well as the branches thereof, is in heat exchanging relation to the splashing oil in the oil sump of the engine, to cool the oil and correspondingly heat the incoming explosive mixture.

The invention relates particularly to an improvement on the subject matter of my pending application, Serial No. 194,134, filed March 5, 1938.

The invention consists in the novel features and in the combinations and constructions hereinafter set forth and claimed.

In describing this invention, reference is had to the accompanying drawings in which like characters designate corresponding parts in all the views.

Figure 2 is a plan view, partly in section, of the removable top wall of the crank case and in which the manifold is formed.

Figure 3 is an end view looking upwardly in Figure 2.

Figure 1:
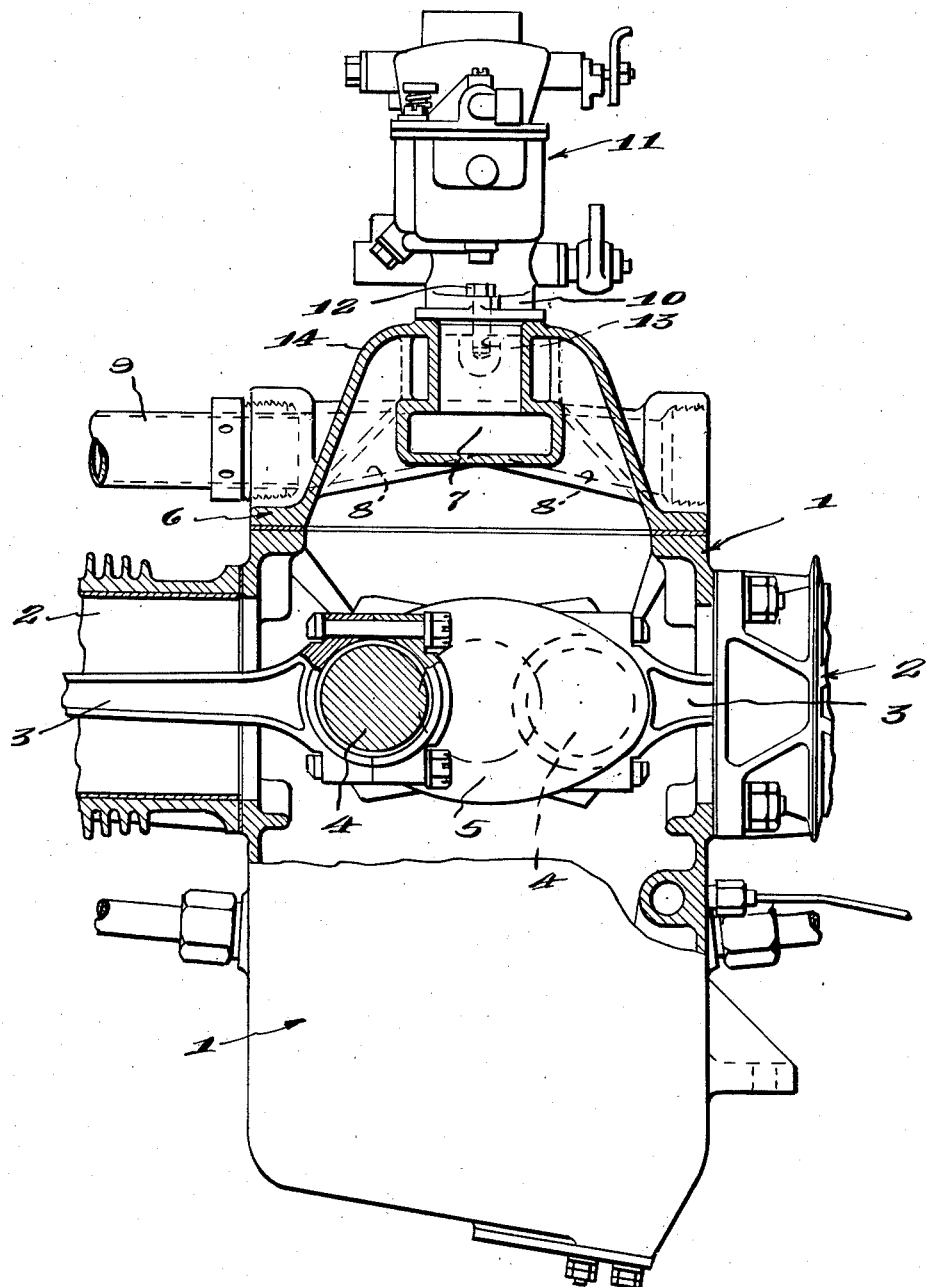
Figure 1 is a fragmentary vertical sectional view, partly in elevation, through the crank case of an engine embodying my invention.

1 designates the crank case of the engine, which serves as an oil sump. 2 designates banks of cylinders extending from opposite lateral sides of the crank case, so that the cylinders are in horizontal position.

3 designates a connecting rod between the piston in each cylinder and a crank 4 on the crank shaft 5 mounted in the crank case.

6 designates the top wall of the crank case, this being preferably removable. It is formed or cast with an intake manifold including a distributing chamber 7 and branches 8 leading therefrom for connection respectively to the intake pipes of the cylinders. These branches open through the edge of the top plate 6. Four branches are shown, as the engine is a four cylinder one with two cylinders in each bank.

The distributing chamber depends into the space below the top plate 6 so that the bottom and side walls of the distributing chamber and the lower walls of the branches 8 are exposed to the oil splashed by the crank shaft, connecting rods, etc. The branches 8 are connected to the intake conduits 9 of the engine cylinders. The distributing chamber opens through the top of the wall 6 for connection to the outlet pipe 10 of the carburetor 11, the carburetor being secured to the top wall in any suitable manner, as by screws 12, threading into openings 13 in the wall 6 at the upper end of the distributing chamber 7.

As here shown, the top wall is formed with a transversely extending dome portion 14 from the apex of which the distributing chamber 7 depends. The central portion of this transverse dome-shaped portion is widened at 15 to provide passages entirely around the distributing chamber. The branches 8 lead from the lower end portion of the distributing chamber. Thus, the oil splashed and thrown by the crank shaft is thrown against the lower sides of the branches 8 and also into the dome portion 14 against the sides of the depending distributing chamber and some of the oil is also splashed on the lower end wall of the depending distributing chamber. Thus, a maxmum heat exchanging surface is provided between the distributing chamber and its branches and the interior of the crank case.

By this arrangement of depending distributing chamber, the oil is cooled to a minimum, and hence the incoming charge from the carburetor heated correspondingly. The top wall is also provided with a suitable filler and breather hole 16 and a hole 17 for an oil gage.

What I claim is:

1. An internal combustion engine including a crank case serving as an oil sump, cylinders mounted on the crank case and extending in opposite directions therefrom, a crank shaft in the crank case, pistons movable in the cylinders and operatively connected to the crank shaft, the crank case having a top wall formed with an intake manifold including a distributing chamber opening through the upper face of said wall for connection to a carburetor and depending in the space below said wall, whereby its lower end and sides are exposed to the splashing oil in the crank case, and branches extending from the distributing chamber for connection to the intake pipes of the cylinders, the branches being on the lower side of the top wall whereby the lower portions and lateral sides of said branches being also exposed to the splashing oil.

2. An internal combustion engine including a crank case serving as an oil sump, cylinders extending in opposite directions from the crank case, a crank shaft in the crank case, pistons in the cylinders and connecting rods between the pistons and the crank shaft, the top wall of the crank case formed with a dome portion having a distributing chamber opening through the top of the dome portion for connection to a carburetor and depending from the top of the dome and depending into the dome and spaced apart from the walls of the dome, the distributing chamber having branches leading therefrom for connection to the intake pipes of the cylinders, the lower portions and lateral side walls of the branches depending below the top wall, all whereby the lower end and side walls of the distributing chamber and the lower walls of the branches are exposed to the splashing oil in the crank case.

CARL T. DOMAN.